United States Patent
Beck

(10) Patent No.: US 6,404,855 B2
(45) Date of Patent: Jun. 11, 2002

(54) CONDITIONER UNIT FOR PAIR GAIN TEST CONTROLLER

(75) Inventor: John Beck, Wake Forest, NC (US)

(73) Assignee: Pairgain Technologies, Inc., Tustin, CA (US)

( * ) Notice: Subject to any disclaimer, the term of this patent is extended or adjusted under 35 U.S.C. 154(b) by 0 days.

(21) Appl. No.: 09/165,464

(22) Filed: Oct. 2, 1998

(51) Int. Cl.[7] .......................... H04M 1/24; H04M 3/08; H04M 3/22

(52) U.S. Cl. ................. 379/27.01; 379/22.05; 379/29.03; 379/1.01; 379/9; 379/22

(58) Field of Search .......................... 379/1, 9, 10, 27, 379/29, 30, 1.01, 1.03, 9.06, 14, 12, 22, 22.04, 22.05, 26.01, 27.01, 27.06, 28, 29.01, 29.03, 29.04, 29.05

(56) References Cited

U.S. PATENT DOCUMENTS

| | | | | |
|---|---|---|---|---|
| 4,258,231 A | * | 3/1981 | Lenz et al. .................... 379/1 |
| 4,270,030 A | * | 5/1981 | Brolin et al. .................. 379/1 |
| 4,653,043 A | * | 3/1987 | Brady et al. .................. 370/13 |
| 5,103,473 A | * | 4/1992 | Sullins et al. ................ 379/29 |
| 5,115,462 A | * | 5/1992 | Kennedy et al. .............. 379/29 |
| 5,187,733 A | * | 2/1993 | Beffel et al. ................... 379/10 |
| 5,195,124 A | * | 3/1993 | Ishioka ......................... 379/27 |
| 5,598,455 A | * | 1/1997 | Bliven et al. ................. 379/27 |
| 5,615,225 A | * | 3/1997 | Foster et al. .................. 379/29 |
| 5,652,712 A | * | 7/1997 | Szczebak, Jr. et al. ......... 379/3 |
| 5,677,941 A | * | 10/1997 | Rice .............................. 379/2 |
| 5,680,391 A | * | 10/1997 | Barron et al. ................ 370/241 |
| 5,832,058 A | * | 11/1998 | Walance et al. .............. 379/22 |
| 5,920,609 A | * | 7/1999 | Toumani et al. .............. 379/29 |
| 5,946,374 A | * | 8/1999 | Bower .......................... 379/29 |

* cited by examiner

Primary Examiner—Curtis Kuntz
Assistant Examiner—Quoc D. Tran
(74) Attorney, Agent, or Firm—Fogg, Slifer, Polglaze, Leffert & Jay, PA

(57) ABSTRACT

A conditioner unit is wired in parallel with a pair gain test controller used to test a digital loop carrier telephone network. The conditioner unit senses a signal intended to request test results from the pair gain test controller and provides a response signal which indicates that the pair gain test controller performed a successful test, even though the pair gain test controller was not activated. This allows testing of the network without use of a bypass pair or the need to interface the digital loop carrier network with the pair gain test controller.

29 Claims, 5 Drawing Sheets

CONDITIONER UNIT FOR PAIR GAIN TEST CONTROLLER

BACKGROUND OF THE INVENTION

In an analog telephone network, a pair of wires—the tip and ring lines—are used to connect a subscriber's telephone to the central office (CO). To test the network, sometimes an automated test system is used; a mechanized loop tester (MLT) is an example of such a test system. The MLT is connected to a central office switch and is connected through the switch to the line pair under test. On plain old telephone service ("POTS") line pairs, the MLT performs a series of automated tests, which include measurements for shorts, opens, resistive faults and foreign voltages, etc.

With the introduction of digital loop carrier (DLC) systems, multiple phone channels are multiplexed onto a line pair. This practice is known as adding pair gain. A DLC system, based on HDSL (high-bit-rate digital subscriber line) technology, is shown in FIG. 1. A central office 10 includes a CO switch 12 and a central office line unit (COLU) 14. In the example of FIG. 1, four line pairs from the CO switch are input to the COLU 14.

The COLU is coupled to a remote line unit (RLU) 16 via a single pair of copper wires, labeled HDSL pair. The HDSL pair is an ordinary pair of copper wires. However, high speed data rates (e.g., 784 Kbps in each direction) are achievable by HDSL technology. HDSL utilizes digital signal processing techniques to create a mathematical model of the HDSL copper pair and compensate for the distortion imparted on the signal by the copper line pair. At the RLU 16, the digital signal is demultiplexed and converted into analog signals corresponding to those which originated at the CO switch 12. The analog signals are supplied to the subscribers' telephones. In this example, one pair of copper wires (the HDSL pair) is used to provide a high speed transmission path for four separate telephone channels.

Testing of the FIG. 1 system is complicated by the fact that there is not a direct analog connection between the CO switch and a subscriber's line. To test the DLC channel, a pair gain test controller (PGTC) is used. A MLT is still used to test the wire pairs beyond the DLC devices.

The mechanized loop tester (MLT-2) 18 is coupled via the trunk tip, trunk ring and trunk sleeve lines to the pair gain test controller 20, which includes a channel tester 22. To test the analog portion of the system, the trunk tip and trunk ring lines are coupled, at the PGTC 20, to a bypass pair 24, via a switch (not shown). When the MLT is connected to the bypass pair 24, the MLT is not coupled to additional circuitry. The bypass pair is coupled, at the RLU 16, to the POTS pair under test. That is, there is a direct analog connection between the MLT 18 and the subscriber's telephone being tested. Through such a connection, the MLT measures for shorts, opens, etc.

To test the digital portion of the network, the channel tester 22 in the PGTC 20 is coupled via the tip, ring and sleeve lines to a Numbered Test Trunk (No Test Trunk) 26. The No Test Trunk 26 and the central office switch 12 connect the tip and ring lines to a selected one of the POTS pairs, which in turn are multiplexed by the COLU 14 onto the HDSL pair. If the digital portion of the network is satisfactorily connected to the PGTC, the PGTC 20 places a 1K Ω resistance value between the trunk tip and trunk ring lines which is interpreted by the mechanized loop test (MLT) 18 as a signal that testing is to proceed. The HDSL pair is coupled to the RLU 16 which demultiplexes the test signals on the HDSL pair for the POTS line under test.

Test information about the digital portion of the network obtained by the PGTC 20 is provided to the MLT 18. That information, along with the analog line test result information obtained directly by the MLT is provided to a service technician for analysis of the test results, and, if needed, corrective action. See generally specification TR-TSY-00465 published by Bellcore.

FIG. 2 illustrates a system wherein the functions of the mechanized loop tester are integrated into the central office switch. This is referred to a I-MLT-2. In the integrated testing situation, a direct connect test unit (DCTU) 30 within the central office switch 12 controls the testing operations.

For an analog, i.e., non-DLC, network, the DCTU 30 is coupled through a modular metallic switch unit (MMSU) 32 to a line unit (LU) 34. The line unit 34 is coupled to the POTS line under test.

In a DLC network, the DCTU is coupled through the MMSU 32 to the trunk tip, trunk ring and trunk sleeve lines, which are in turn coupled to the pair gain test controller 20. To test the digital portion of the network, the channel tester 22, within the PGTC 20, is coupled via the tip and ring lines back through the MMSU 32, over to the line unit 34, and then to the POTS line under test. There is no connection for the sleeve line out of the PGTC 20. The POTS line is coupled to the COLU 14 which in turn is coupled to the RLU via the HDSL pair. If the digital portion of the network is satisfactorily connected to the PGTC, the PGTC 20 places a 1K Ω resistance value between the trunk tip and trunk ring lines which is interpreted by the DCTU as a signal that testing is to proceed.

As with the non-integrated case, the network beyond the DLC is tested using the bypass pair 24. The trunk tip and trunk ring lines are coupled to the bypass pair 24 via switches (not shown) within the PGTC 20. During such test, the channel tester 22 is isolated from the trunk tip and trunk ring lines. Like the MLT in the non-integrated case, the DCTU 30 measures for shorts, opens, resistive faults and foreign voltages on the subscriber's line under test.

A major draw back of the FIGS. 1 and 2 systems is that for testing, a bypass pair 24 is required for every COLU/RLU pair. In other words for every HDSL pair, a bypass pair is required for testing purposes. This significantly lessens the extra line capability provided by the digital loop carrier system. Often, crafts personnel "borrow" the bypass pairs to correct other service problems and thus, they are not available when needed for testing.

A further disadvantage of the prior integrated testing technique is increased cost resulting from the need to provide an interface within the DLC to the PGTC.

SUMMARY OF THE INVENTION

Accordingly, it is an object of the present invention to provide a digital loop carrier system which does not require the use of a bypass pair for testing purposes.

It is an additional object of the invention to lessen DLC system costs by allowing a pair gain test controller to remain idle during testing, yet have a satisfactory system pass testing.

In accordance with the invention, a conditioner unit for a pair gain test controller is provided. The PGTC conditioner unit (PCU) is coupled to the PGTC via the sleeve line and the trunk ring line. The PCU senses a signal which indicates that the DCTU is seeking test results from the PGTC, and provides a signal which indicates to the DCTU that the PGTC test results are satisfactory, even though the PGTC remained idle.

BRIEF DESCRIPTION OF THE DRAWINGS

Aspects of the invention are described with reference to the drawings, in which:

FIG. 3 is a block diagram of a digital loop carrier comprised of a PG-Plus central office line unit 15 and PG-Plus remote line unit 17. The PG-Plus COLU and RLU are manufactured and sold by ADC of Eden Prairie, Minn., USA.

Figure 1:
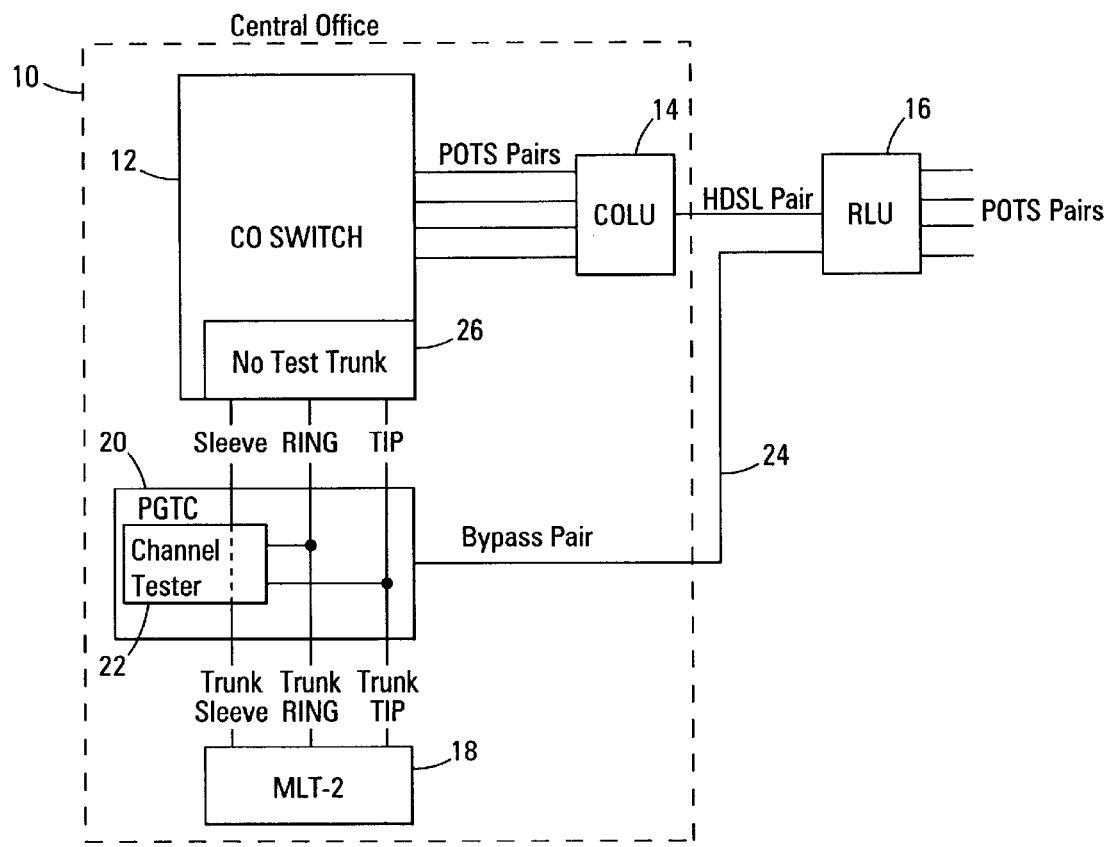
FIG. 1 is a block diagram of a digital loop carrier (DLC) which uses a pair gain test controller (PGTC) under control of a mechanized loop tester (MLT) to perform testing on the network.
Figure 2:
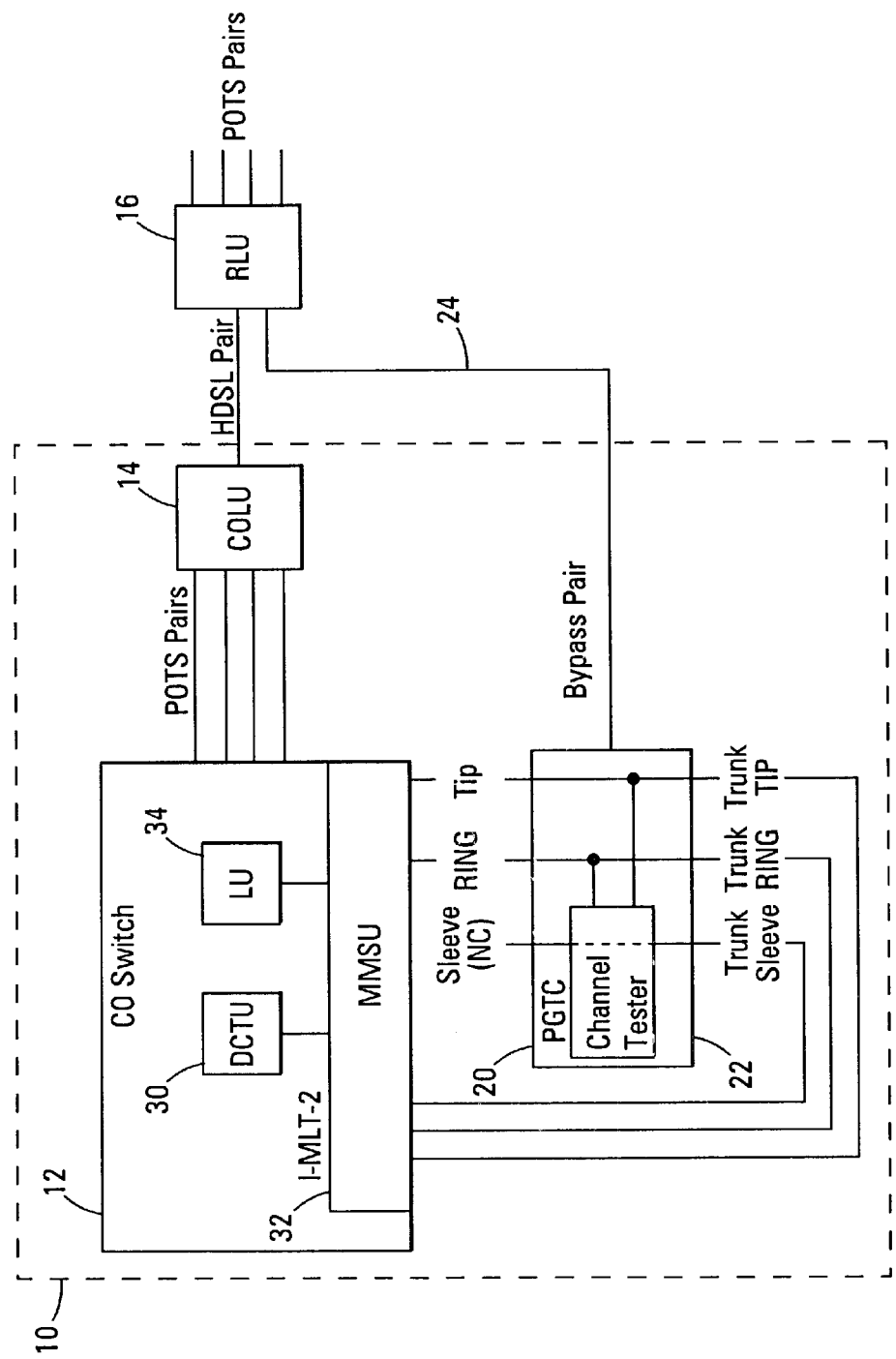
FIG. 2 is a block diagram of a DLC which uses a PGTC under control of an integrated mechanized loop tester (I-MLT) to perform testing on the network.
Figure 3:
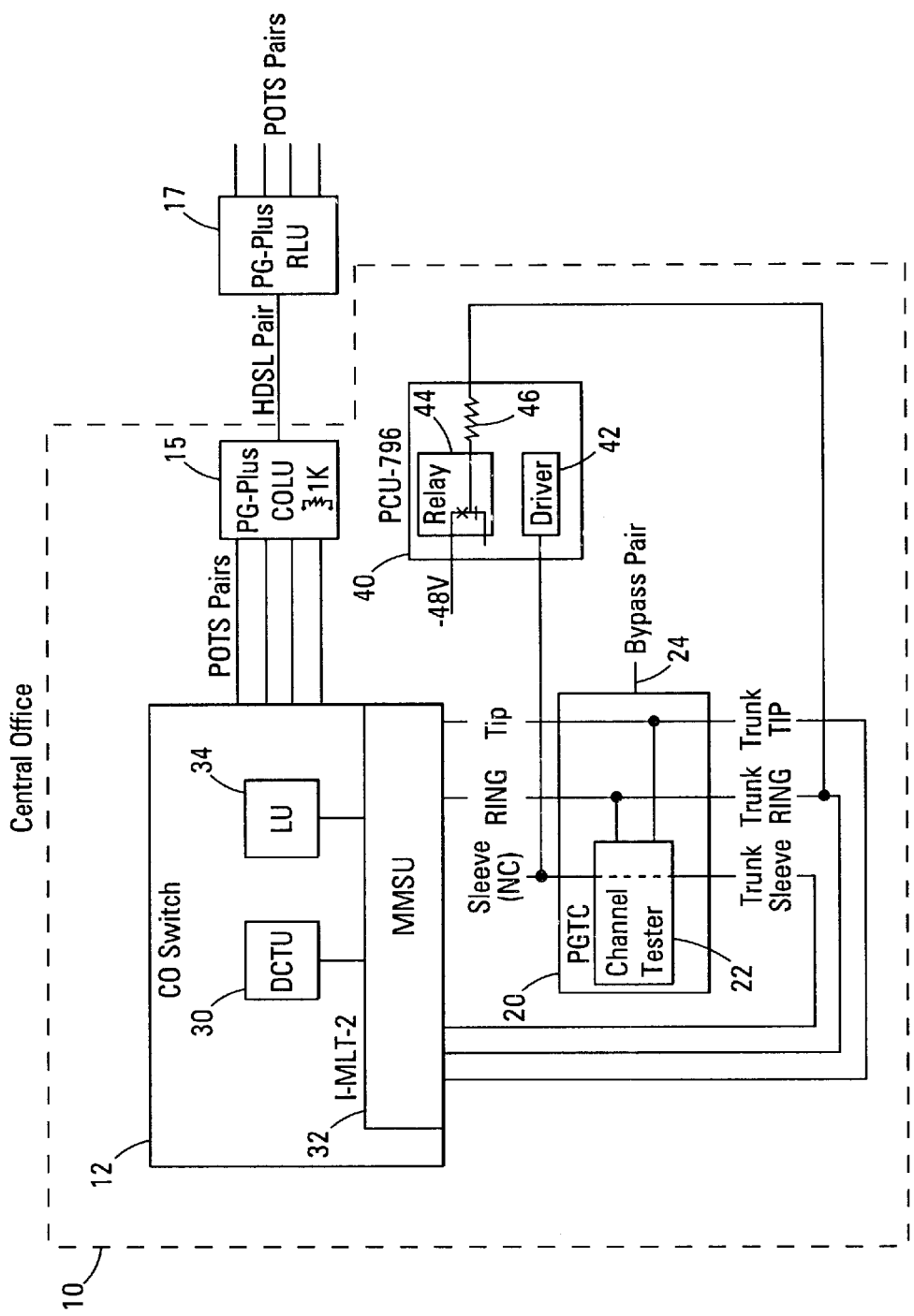
FIG. 3 is a block diagram of a DLC which includes a PGTC conditioner unit (PCU) in accordance with the present invention.

The FIG. 3 DLC includes a PGTC conditioner unit (PCU) 40 according to the present invention. The input to the PCU is coupled to the sleeve line from the PGTC 20. Within the PCU, the input to the PCU is coupled to a driver 42, which controls the state of a relay 44. When the driver 42 senses no sleeve current, it causes the relay 44 to connect −48V, which is supplied to the PCU from a central office battery (not shown), through a resistor 46 to the trunk ring line, which is coupled to the DCTU 30 via the MMSU 32.

During I-MLT-2 testing of the PG Plus DLC, the DCTU 30 is coupled through the MMSU 32 to the trunk tip, trunk ring and trunk sleeve lines, which are coupled to the PGTC 20. The PGTC communicates with the PG-Plus COLU 15, via the tip and ring lines, the MMSU 32 and the LU 34. Normally, to test a subscriber's line, the central office test system will dial the subscriber's number in such a way as to cause the switch to connect the line to the tester. This connection is made through the PGTC. In the IMLT case, the line under test is connected through the LU, through to the MMSU, through the PGTC, back through the MMSU, and finally through to the DCTU.

If the DCTU then detects the presence of a DLC, the DCTU will cause the PGTC to commence a handshake sequence with the COLU. The DCTU starts this by applying 116V on the tip line with the ring line open. The PGTC and the DLC both see the 116V. Upon seeing the 116V, the PGTC waits for a 333 Hz tone and a handshake signal from the COLU. The COLU, seeing the 116V applies the 333 Hz tone back over the ring line and commences the handshake sequence. When the DLC and PGTC successfully finish the handshake sequence, the PGTC becomes satisfied that the DLC is properly configured to be tested. As an indication to the DCTU that the PGTC is satisfied, the PGTC places a 1K Ω resistance value on the tip lead (that still has the 116V on it from the DCTU) to ground. The DCTU proceeds by changing the current state on the trunk sleeve lead from high to low current. Seeing the low current state, the PGTC activates its switches thereby separating the transport (HDSL) portion from the subscriber's line. The PGTC then commences testing on the DLC while the MLT commences testing on the subscriber's line over the bypass pair.

Figure 4A:
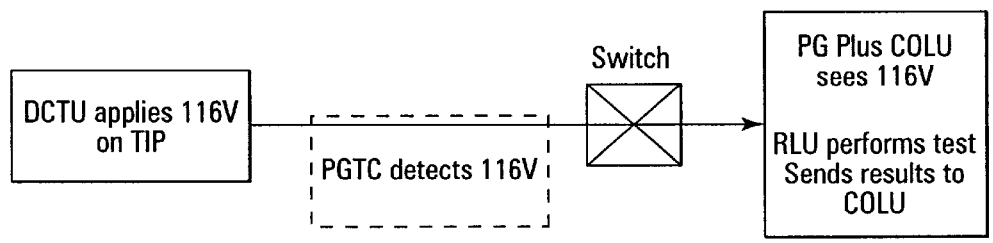
FIGS. 4(a)–4(c) are diagrams showing the signals passed between the DCTU and the DLC in accordance with the present invention.
Figure 4B:
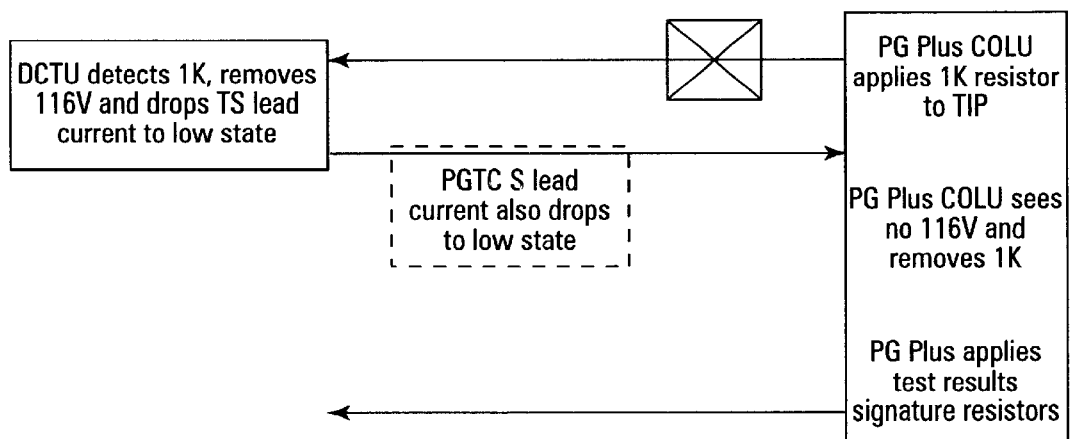

However, in the case of the PG Plus DLC, the PG-Plus COLU 15, seeing the 116V, does not apply the 333 Hz tone nor does it try to handshake with the PGTC. Instead, referring to FIG. 4(a), the PGTC is allowed to wait, while the PG-Plus system performs testing of its own on the subscriber's line. As shown in FIG. 4(b), when this testing is finished, the PG-Plus COLU applies a 1K Ω resistance value on the tip line. This is interpreted by the DCTU as an indication that the PGTC is ready to proceed with testing, not withstanding that the PGTC was not actually activated. In response to the 1K Ω resistance value on the tip line, the DCTU removes the 116V signal and sets the trunk sleeve line to a low current state. In response to the removal of the 116V signal on the tip line, the PG Plus COLU removes the 1K Ω resistance value and applies test results signature resistors for sensing by the DCTU.

As noted above, the PG Plus DLC performs testing on the subscriber's line. The test results are sent by the PG-Plus RLU to the PG-Plus COLU 15. The PG-Plus COLU in turn provides the test results to the DCTU 30. Thus, information about the quality of the subscriber's line is provided to the DCTU without use of the bypass pair 24.

In accordance with the I-MLT-2 procedure, the DCTU, seeks to obtain test results about the DLC (i.e., the PG-Plus COLU and RLU) from the PGTC 20. To obtain such test results, the DCTU 30 sets the current on the trunk sleeve line to zero. Ordinarily (i.e., in a no test situation), the trunk sleeve current is approximately 17 mA (high current state). When the PGTC 20 is to be activated, the DCTU sets the trunk sleeve current to approximately 8 mA (low current state). Again, when the DCTU seeks to obtain test results about the DLC from the PGTC 20, the DCTU sets the trunk sleeve current to zero.

In response to the low current (8 mA) state on the trunk sleeve line, the PGTC 20 would ordinarily perform testing of the DLC by use of the channel tester 22 through the tip and ring lines, the MMSU 32, the LU 34, the POTS pair, the PG-Plus COLU 15 and the HDSL pair to the PG-Plus RLU 17 (see FIG. 3). In response to the no current (0 mA) state on the trunk sleeve line, the PGTC 20 would ordinarily return its test results to the DCTU on the trunk ring line. Successful testing of the DLC by the PGTC 20 would result in the PGTC 20 placing a −48V voltage signal on the trunk ring line. The −48V signal would be interpreted by the DCTU as a test OK signal.

However, the case of the PG-Plus DLC, the PGTC 20 is not activated. Accordingly, in response to the DCTU setting the trunk sleeve current to zero, the PGTC 20 will not apply the −48V signal to the trunk ring line. The lack of such response by the PGTC 20 would be interpreted by the DCTU 30 as a test fail condition.

Figure 4C:
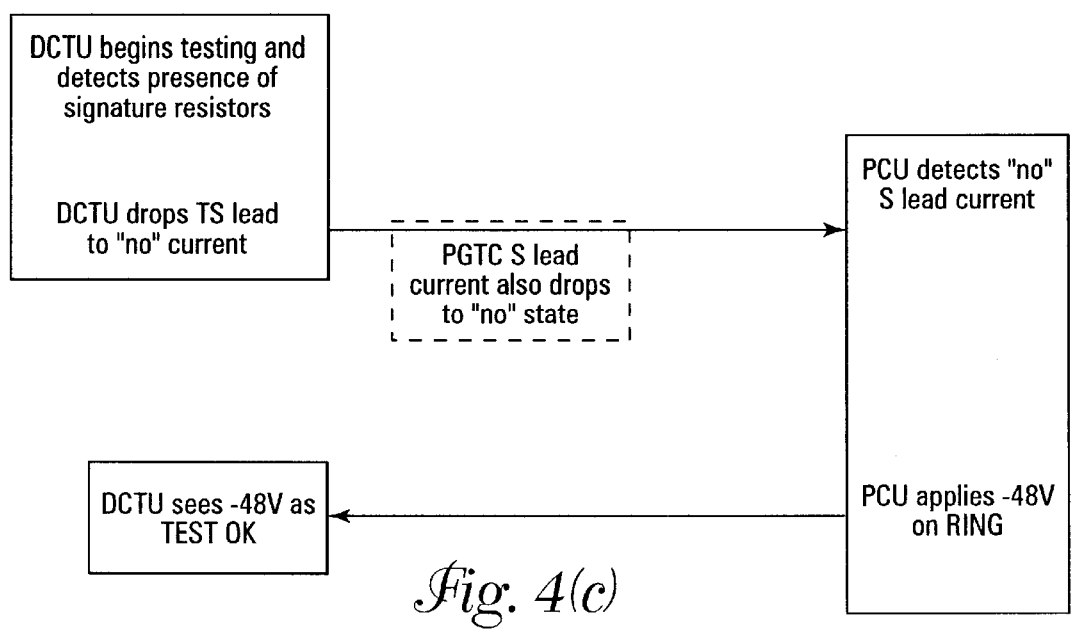

To overcome such problem, the PCU 40 is used. Referring to FIG. 4(c), the PCU senses the current on the sleeve line. When the current goes to zero, the PCU applies a −48V voltage signal to the trunk ring line. The −48V signal is interpreted by the DCTU 30 as a DLC test OK signal from the PGTC 20, even though the PGTC was not activated.

Figure 5:
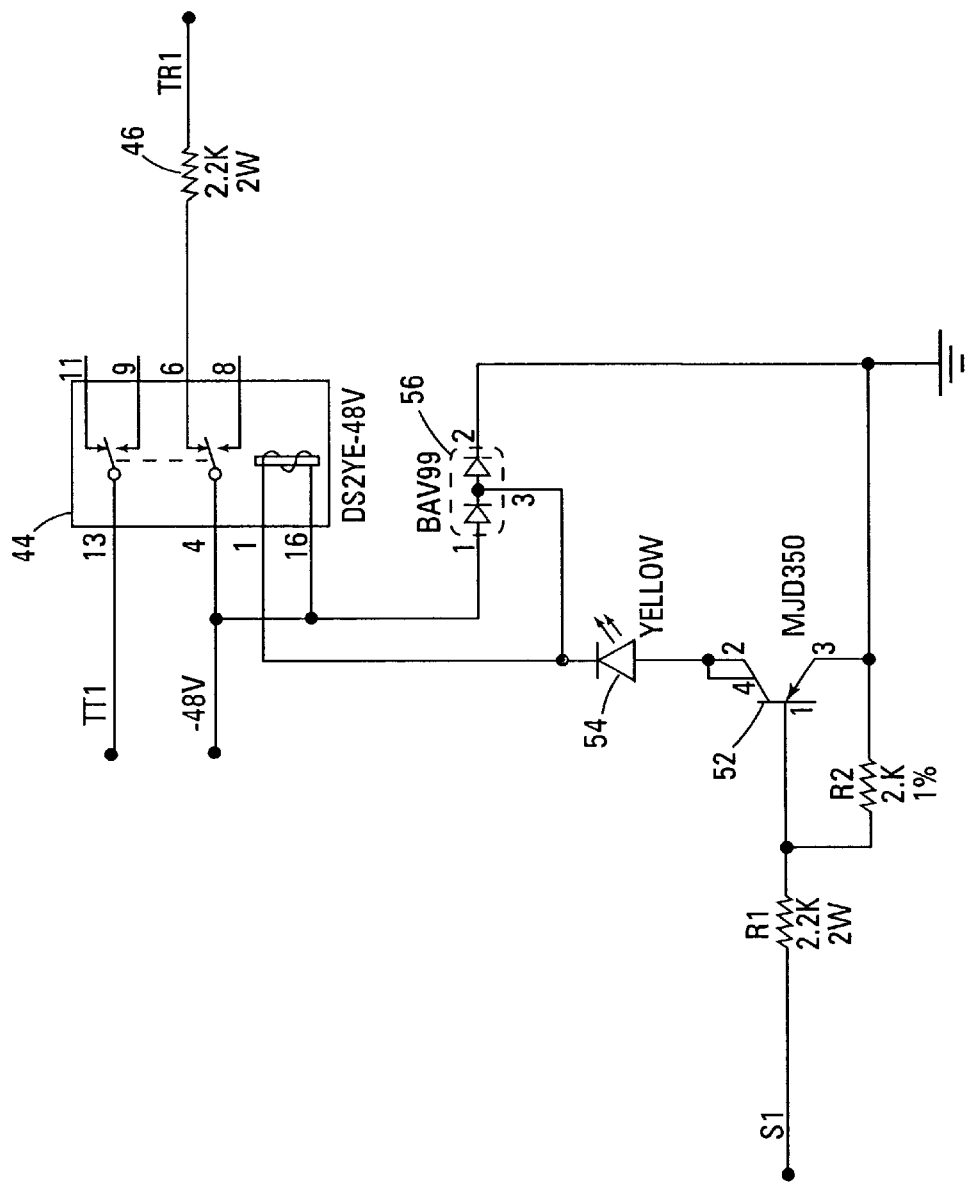
FIG. 5 is a schematic diagram of the PCU in accordance with the present invention.

FIG. 5 is a schematic diagram of the circuitry comprising the PGTC conditioner unit. The main components of the PCU are the relay 44 and a drive transistor 52. The base of the drive transistor 52 is coupled to the sleeve line S1, via a resistive divider comprised of resistors R1, R2. The emitter of transistor 52 is coupled to ground. The collector of drive transistor 52 is coupled, through indicator light emitting diode (LED) 54, to one of the coil inputs of the relay 44. The other coil input to relay 44 is coupled to the −48V central office power source. Diode pair 56 keeps the voltage at pin 16 of the relay within the range of a diode drop below −48V and a diode drop above ground. Relay 44 is shown as a double pole, double throw relay, DS2YE −48V. However, other types of relays, e.g., a single pole, single throw, or a switch, e.g., an analog switch, can be used. Also, a relay or switch could be driven directly by sleeve line S1 without use of a drive transistor 52. In FIG. 5, the trunk tip line TT1 is shown as being applied to pin 13 of relay 44. The trunk tip line is connected to the PCU simply because telephone connections are made with a pair of lines. The trunk tip line is not used by the PCU.

When current is present on the sleeve line S1, transistor 52 turns on so that the collector is pulled close to ground. Thus, approximately 48 volts is applied across the coil of relay 44. This causes the relay contact to be pulled down so that output pin 8 is connected to the −48V at input pin 4, and output pin 6 is open. Output pin 6 is coupled through resistor 46 to the trunk ring line TR1. Thus, when current is present on the sleeve lead (because, the PGTC is in the idle state or is actively testing, thus not being asked for test results), the trunk ring line is unaffected by the PCU.

On the other hand, when the DCTU sets the sleeve current to zero (to ask the PGTC for its test results) and the PGTC has not been activated, transistor 52 in the PCU will turn off. In such case, no voltage will be applied across the coil of relay 44, and relay output pin 6 will be connected to the −48V applied to relay input pin 4. Thus, the −48V central office battery voltage will be applied (through resistor 46) to the trunk ring line TR1. This will be interpreted by the DCTU as the PGTC's completion of a successful test of the DLC, even though the PGTC was not actually activated.

What is claimed is:

1. A conditioner unit coupled to a pair gain test controller, which under control of a test unit, is intended to test a digital loop carrier (DLC) system, the test unit requesting a test results signal from the pair gain test controller, the conditioner unit comprising:
   a sensing circuit which senses that the test unit is requesting test results from the pair gain test controller and provides a control signal in response thereto, wherein the sensing circuit is coupled to an input of the pair gain test controller; and
   a switching device, responsive to the control signal, for providing to the test unit a DLC test successful signal in place of the test results signal requested from the pair gain test controller, wherein the switching device is coupled to an output of the pair gain test controller.

2. The conditioner unit of claim 1, wherein a trunk sleeve line is coupled between the test unit and the pair gain test controller, the trunk sleeve line being set to a predefined state when the test unit requests the test results signal from the pair gain test controller, the sensing circuit in the conditioner unit sensing the predefined state.

3. The conditioner unit of claim 2, wherein the predefined state is a zero current state.

4. The conditioner unit of claim 2, wherein the sensing circuit includes a transistor.

5. The conditioner unit of claim 4, wherein a base of the transistor is coupled to the trunk sleeve line, an emitter of the transistor is coupled to ground and a collector of the transistor is coupled through an inductance to a first reference voltage.

6. The conditioner unit of claim 5, wherein the switching device comprises a relay.

7. The conditioner unit of claim 6, wherein a coil of the relay provides the inductance coupled between the collector of the transistor and the first reference voltage.

8. The conditioner unit of claim 7, wherein a trunk ring line is coupled between the test unit and the pair gain test controller, the DLC test successful signal being applied to a trunk ring line by the conditioner unit.

9. The conditioner unit of claim 8, wherein the DLC test successful signal is coupled to an output of the relay, an input to the relay is coupled to a second reference voltage, and the relay output is coupled to the relay input when the transistor senses the predefined state on the trunk sleeve line.

10. The conditioner unit of claim 8, wherein an indicator light is coupled to the control signal to indicate when the conditioner unit is applying the DLC test successful signal to the trunk ring line.

11. In a telephone system having a subscriber line coupled to a digital loop carrier (DLC) network which includes a central office line unit (COLU), the system including a test unit and a pair gain test controller (PGTC) which, under control of the test unit, is intended to test the DLC network, a method of testing the subscriber line while keeping the PGTC idle, the method comprising:
   using the DLC network to test the subscriber line and provide test results to the test unit;
   in response to the PGTC seeking to connect to the COLU to perform testing of the DLC network, holding the PGTC in a wait state;
   providing a signal from the COLU which is interpreted by the test unit as meaning that the PGTC is ready to proceed with testing of the DLC network;
   sensing a signal from the test unit which indicates that the test unit is seeking test results from the PGTC; and
   while the PGTC continues to be in a wait state, and in response to sensing the signal from the test unit, providing a response signal to the test unit which indicates that the PGTC performed a successful test of the DLC network.

12. The method according to claim 11, wherein tip and ring lines couple the PGTC to the COLU and the step of providing a signal from the COLU comprises applying a 1KΩ resistance value from the tip line to ground.

13. The method according to claim 11, wherein trunk tip and trunk ring lines couple the test unit to the PGTC and the step of providing the response signal to the test unit comprises applying a voltage signal on the trunk ring line.

14. The method according to claim 14, wherein the voltage signal is approximately −48V.

15. The method according to claim 14, wherein the voltage signal is supplied by a PGTC conditioner unit having an input coupled to a sleeve line output from the PGTC and an output coupled to the trunk ring line input to the PGTC.

16. A pair gain test controller conditioner unit for coupling to a pair gain test controller and to a central office switch of a telephone system, the conditioner unit comprising:
   a resistor for coupling to the pair gain controller through a trunk ring line and to the central office switch through the trunk ring line;
   a relay having a first state for coupling a power source to the trunk ring line through the resistor and a second state for decoupling the power source from the trunk ring line; and
   a driver for controlling the state of the relay, wherein the driver is responsive to a current state of a sleeve line coupled to the pair gain test controller.

17. A pair gain test controller conditioner unit for coupling to a pair gain test controller and to a central office switch of a telephone system, the conditioner unit comprising:
   a drive transistor having a base for coupling to a sleeve line through a first resistor and to a ground through a second resistor, an emitter for coupling to the ground, and a collector;
   a relay having a first coil input coupled to the collector of the drive transistor, a second coil input for coupling to a power source, an input pin for coupling to the power source and coupled to the second coil input, and an output pin for coupling to a trunk ring line through a third resistor; and
   a diode pair, wherein the diode pair has a first diode and a second diode, wherein the first diode has an input coupled to the second coil input of the relay and an output coupled to the first coil input of the relay and wherein the second diode has an input coupled to the output of the first diode and an output for coupling to the ground.

18. The pair gain test controller conditioner unit of claim 17, further comprising a third diode coupled between the collector of the drive transistor and the first coil input of the relay.

19. A telephone system, comprising:
a central office switch coupled to a ring line and a tip line;
a pair gain test controller coupled to the ring line, the tip line and a sleeve line; and
a conditioner unit, wherein the conditioner unit comprises:
  a relay having an input coupled to a power source and an output coupled to a trunk ring line through a resistor, wherein the relay has a first state for coupling the power source to the trunk ring line through the resistor and a second state for decoupling the power source from the trunk ring line; and
  a driver for controlling the state of the relay, wherein the driver is responsive to a current state of the sleeve line.

20. The telephone system of claim 19, wherein the driver places the relay in the first state when no current is present on the sleeve line and wherein the driver places the relay in the second state when current is present on the sleeve line.

21. A telephone system, comprising:
a central office switch coupled to a ring line and a tip line;
a pair gain test controller coupled to the ring line, the tip line and a sleeve line; and
a conditioner unit, wherein the conditioner unit comprises:
  a drive transistor having a base coupled to the sleeve line through a first resistor and to a ground through a second resistor, an emitter coupled to the ground, and a collector;
  a relay having a first coil input coupled to the collector of the drive transistor, a second coil input coupled to a central office power source, an input pin coupled to the central office power source and to the second coil input, and an output pin coupled to a trunk ring line through a third resistor; and
  a diode pair, wherein the diode pair has a first diode and a second diode, wherein the first diode has an input coupled to the second coil input of the relay and an output coupled to the first coil input of the relay and wherein the second diode has an input coupled to the output of the first diode and an output coupled to the ground.

22. The telephone system of claim 21, wherein the conditioner unit further comprises a third diode coupled between the collector of the drive transistor and the first coil input of the relay and wherein the third diode is a light emitting diode to indicate when the drive transistor is driving the relay.

23. A telephone system, comprising:
a central office switch coupled to a ring line and a tip line;
a pair gain test controller coupled to the ring line, the tip line and a sleeve line; and
a conditioner unit in parallel with the pair gain test controller, wherein the conditioner unit applies a voltage signal to a trunk ring line when the sleeve line is in a no current state and wherein the conditioner unit removes the voltage signal from the trunk ring line when the sleeve line is in a low current state or a high current state;
wherein the sleeve line is in the no current state when a current level on the sleeve line is approximately zero, wherein the sleeve line is in the low current state when a current level on the sleeve line is approximately 8 mA, and wherein the sleeve line is in the high current state when a current level on the sleeve line is approximately 17 mA.

24. A telephone system, comprising:
a central office switch coupled to a ring line and a tip line;
a pair gain test controller coupled to the ring line, the tip line and a sleeve line; and
a conditioner unit in parallel with the pair gain test controller, wherein the conditioner unit applies a voltage signal to a trunk ring line when the sleeve line is in a no current state and wherein the conditioner unit removes the voltage signal from the trunk ring line when the sleeve line is in a low current state or a high current state;
wherein the conditioner unit applies the voltage signal to the trunk ring line when the sleeve line is in the no current state and while the pair gain test controller is in an inactive state.

25. A method of operating a telephone system having a subscriber line coupled to a digital loop carrier network, wherein the telephone system includes a pair gain test controller for testing of the digital loop carrier network, the method comprising:
testing the subscriber line while the pair gain test controller is in an inactive state;
sensing a first signal to an input of the pair gain test controller subsequent to testing the subscriber line and while the pair gain test controller is in the inactive state, wherein the first signal is indicative of whether the telephone system is seeking test results from the pair gain test controller; and
applying a voltage signal to an output of the pair gain test controller when the first signal indicates that the telephone system is seeking test results from the pair gain test controller and while the pair gain test controller is in the inactive state.

26. The method of claim 25, wherein the voltage signal is interpreted by the telephone system as a successful test of the digital loop carrier network by the pair gain test controller even though the pair gain test controller is in the inactive state.

27. The method of claim 25, wherein the first signal is a current state of the input of the pair gain test controller.

28. The method of claim 25, wherein the input of the pair gain test controller is a trunk sleeve line and wherein sensing the first signal to the input of the pair gain test controller further comprises sensing a current state of the trunk sleeve line on a sleeve line.

29. The method of claim 25, wherein the output of the pair gain test controller is a trunk ring line.

* * * * *